Sept. 11, 1945. R. W. TYLER 2,384,657
METHOD OF MAKING PHOTOGRAPHIC FILMS
Filed Feb. 12, 1942 3 Sheets-Sheet 1

RAYEN W. TYLER
INVENTOR

BY
ATTY & AG'T

Sept. 11, 1945.  R. W. TYLER  2,384,657
METHOD OF MAKING PHOTOGRAPHIC FILMS
Filed Feb. 12, 1942  3 Sheets-Sheet 2
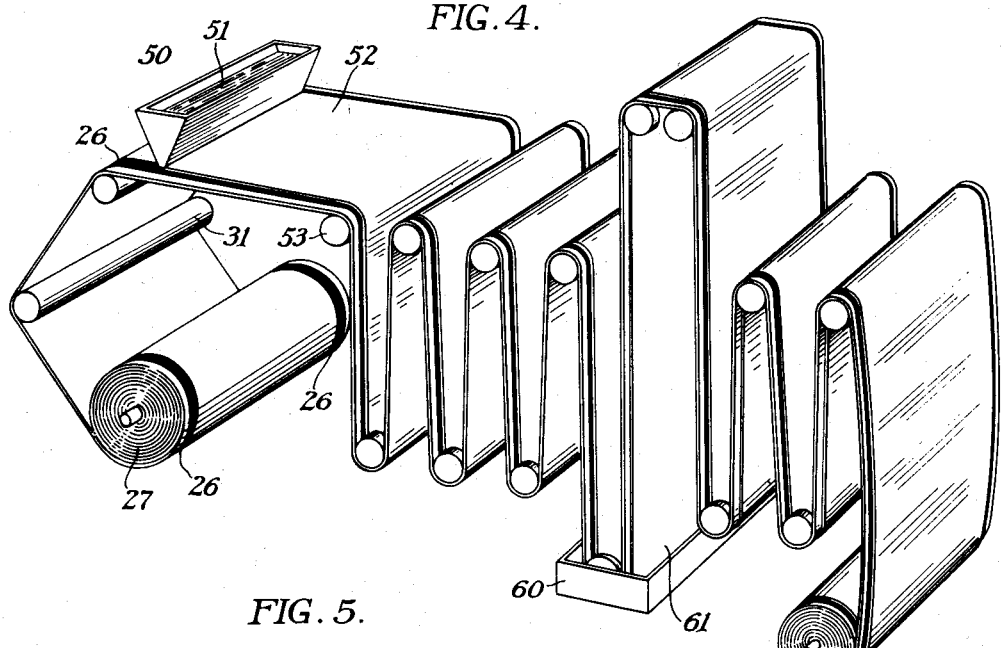
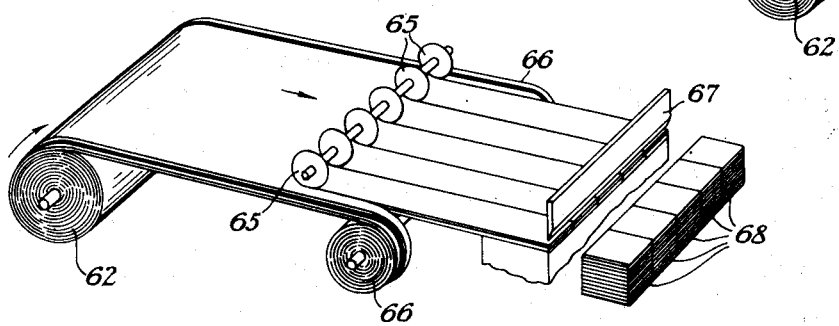
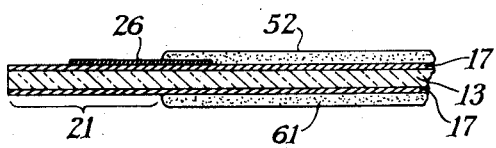
RAYEN W. TYLER
INVENTOR
BY
ATTY & AGT

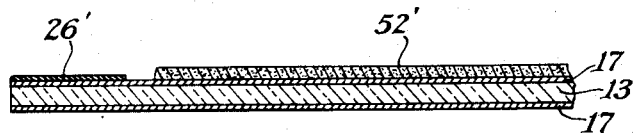
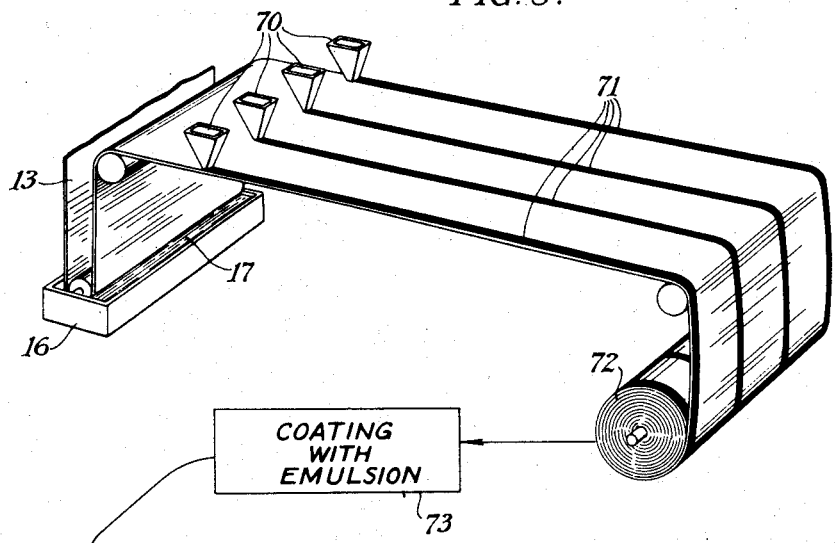
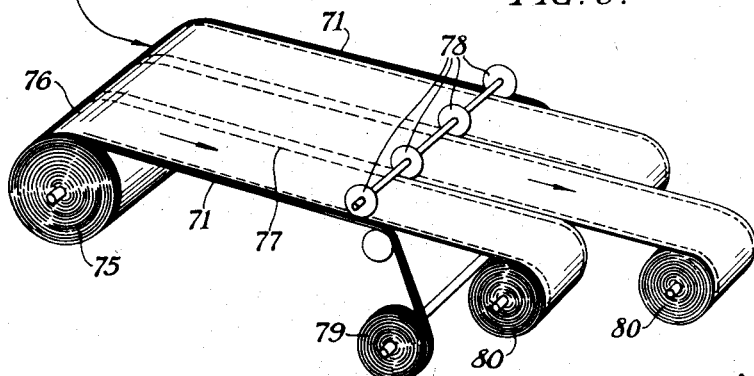

Patented Sept. 11, 1945

2,384,657

UNITED STATES PATENT OFFICE 2,384,657

METHOD OF MAKING PHOTOGRAPHIC FILMS

Rayen W. Tyler, Rochester, N. Y., assignor to Eastman Kodak Company, Rochester, N. Y., a corporation of New Jersey Application February 12, 1942, Serial No. 430,650

10 Claims. (Cl. 117—4)

This invention has to do with the manufacture of photographic film or photographic paper.

Both in the manufacture and in the use of photographic films of all types, there is a phenomenon which occasionally causes trouble and which is referred to generally as "static." As is well known, this phenomenon is due to the formation and discharge of electrostatic charges either positive or negative. The discharge of these electrostatic charges exposes the sensitive film leaving a characteristic mark after development. The word "static" is used by those familiar with this photographic phenomenon to refer in one case to the electrostatic charges on the film, in another case to refer to the movement of these charges, i. e. to the discharge thereof, and in the third case to the resultant marks on the film. This is not unusual since an analogous situation occurs in radio reception wherein the term "static" is used to refer not only to the charges and the discharge thereof, but also to the resulting noise heard in the loud speaker.

Various procedures have been proposed for the elimination or prevention of static, many of these procedures being based on the theory that the film should be made sufficiently conducting to discharge the static harmlessly. However, from my observations I have adopted a somewhat different theory for the operation of a conducting layer. Instead of assuming that a conducting layer carries away the electrostatic charges when they are formed, I conclude that the major effect is one which may be described as a prevention of the formation of the charges. This distinction may, at first, appear trifling, but it explains some of the deficiencies in previous static elimination systems relying on conductivity, and it aids in explaining some of the more important advantages of the present invention. Static is formed by the contact and separation of two surfaces and in the case of film, the source of static may be considered as the point of some surface which the film touches, perhaps rubs and separates from.

The distinctive characteristics of this particular theory I have adopted are: (1) the conducting layer must be near or right at the source of the static, at least near enough to provide high electrical capacity between the conducting layer and the generating surface at the point of static formation. (2) There is no need for the conducting layer to be in electrical contact with the photosensitive emulsion itself. (3) The conducting layer may even be on the opposite side of a thin film from either the point of static formation or from the emulsion. (4) If the source of static is spaced slightly from the emulsion, the conducting layer may also be spaced from the emulsion, and as pointed out above, must be near the source. (5) Also, since the additional conducting layer, according to theory, prevents the formation of static rather than acting to conduct it away, it doesn't matter whether the emulsion layer itself is conducting or not. (6) If the emulsion layer doesn't have to be particularly conducting, especially during drying thereof, its other properties such as speed, susceptibility to moisture, keeping qualities, etc., can often be improved by the omission of constituents otherwise necessary to insure sufficient conductivity thereof.

These ramifications of the theory just listed have all been confirmed by me in practice and in fact, resulted from actual observations.

According to the present invention, this theory is applied to the problem of eliminating static during the manufacture of photosensitive film or paper. Such static elimination is the primary object of the invention. A method of manufacturing photographic film is provided which is substantially free of static and which consists of placing an electrically conducting border along at least one selvage of a roll of film base and then coating the photosensitive layer onto the film base between the selvages.

Of course, any static formed on the film base prior to emulsion coating is harmless unless it remains stored and discharges after the emulsion is coated thereon. The emulsion layer itself is conducting especially when wet, and, hence, it was previously thought that static should not occur during emulsion coating and drying since the layer itself could conduct away any charges and indeed by careful handling of the film during coating and drying and by using an emulsion which is fairly conducting even when dry, static-free films could be produced. However, with ordinary emulsion coating processes complete absence of or freedom from static was not assured even while the emulsion layer was wet. I have found that the source of the static in such cases was the selvages of the film base which receive no emulsion layer, and that conducting the charges away through the mulsion does not eliminate the trouble. In order to be near the source of static, conducting borders are placed according to the present invention on one or both of the selvages of the film prior to the emulsion coating.

This conducting border may be along either but is preferably along both selvages. It may be on either side of the film base since the thickness of the base does not interfere appreciably with the electrical condenser action. Even a narrow border has some effect, but the wider the better except that there is no point in encroaching too far into the useful emulsion area. A border from 1/16 to 3 inches wide gives useful results but neither limit is critical. This conducting border may cover any part of the selvage, but preferably should cover most of the selvage and come at least quite close to the emulsion area although there is only a relatively small increase in efficiency when electrical contact is made with the emulsion layer. On the other hand, for complete elimination of static I preferably coat the conducting border onto all of the selvages and overlap onto a narrow strip between the selvages, so that when the emulsion layer is coated, it overlaps the border. This overlapped area may be trimmed away with the selvages or may remain along the edge of the film to be used in a combination of the present invention with another to be described in detail below.

Also the conducting border is preferably but not necessarily continuous. A broken band is perhaps less efficient because of the spaces between the conducting areas, but I have found that the conducting border (probably due to capacity effects) acts to prevent static even with a discontinuous line. This is further confirmation of the theory outlined above. However, it is usually more convenient to coat a continuous line and there is no disadvantage in doing so. The border may be of any conducting material; I prefer to use carbon dispersed in gelatin, in cellulose nitrate or in a cellulose ester or ether which may be applied as described in U. S. 2,271,234, Staud et al.

In those emulsion coating processes in which the film is handled practically entirely by the edges especially during drying and even when coating both sides, the present borders are particularly useful since they are located exactly at the only source of static. The remainder of the film, i. e. the part coated with emulsion, need not be conducting at all and, hence, may be adjusted in composition without regard to static, thus permitting better speed, keeping qualities, etc. In connection with films such as X-ray film which is coated on both sides of the base, I have found that after the conducting layer is placed on one side of the base it makes practically no difference which side is emulsion coated first. Also, there is definitely little point in having a conducting border on both sides of each selvage, although, of course, there would be no harm therein. This also tends to confirm the theory which in turn requires that the conducting layer be on the selvages because they receive no emulsion, rather than only on parts of the base covered by the emulsion. It is believed that the efficiency of the conducting band to prevent the generation of static is proportional to its area (not necessarily linearly) but there is no direct confirmation of this, because the surfaces cooperating with the selvage to produce static may not touch all of the selvage. However, I prefer to use a border coming substantially out to the outer edges of the film base and coming in far enough to be overlapped slightly by the emulsion so that all of the selvage is definitely covered, even though narrower conducting strips on the selvage do give useful results.

After the emulsion is coated, the selvages are trimmed away carrying the conducting borders or the major portion thereof with them. It is customary to trim away some of the emulsion layer with the selvages. This trimming operation may take place at the same time as the film is slit to commercial sizes.

The present invention may be combined with the idea of having a conducting border on finished film (i. e. film ready for exposure) under the edges of the emulsion to be effective in reducing static while the film is being exposed in a camera. Such borders on finished film are known and differ in operation from the main invention in two ways. First, the finished film is not conducting and hence the need for conducting strips is apparent even on the old theory of static prevention and second, such borders on finished film are only partly effective for their purpose because they are not at all of the sources of static and pure conductivity effects are practically useless whereas the borders on the selvage are fully effective during emulsion coating since they are at the only source of static as they must be for capacity effects. However conducting borders on finished film do give some useful effects and a combination thereof with the present invention is remarkably convenient to make. This combination is obtained by providing a film base whose width between the selvages equals a multiple of the standard width required, e. g. for films for aerial cameras, and the conducting strips are coated not only onto the selvages according to the present invention but also at intervals across the roll equal to this standard width. The photosensitive layer is then coated onto the base between the selvages so as to cover a portion of each of the strips which are also on the selvages and to cover all of the intermediate strips. The selvages together with a portion of their conducting strips are trimmed away and the wide roll is slit along each of the intermediate strips to form rolls of standard width with conducting borders, quite narrow ones, under the emulsion layer. Such a finished film is not claimed to be new in itself, but the novel method of providing it is conveniently combined with the present invention.

How much of the edge of a film constitutes the selvage is not usually exact, but the term is here taken to mean that portion of the film base which receives no emulsion coating. The part of the coated film which is trimmed away and discarded or salvaged is wider than the selvage and includes a narrow strip of emulsion coated base. Since the present invention relates to static, all of the terms used are with reference to electrostatic charges. For example, the term "electrically conducting" does not necessarily mean highly conducting but merely sufficiently conducting to disperse electrostatic charges, or more exactly to prevent the generation of static charges. An emulsion layer, depending on the relative humidity with which it is in equilibrium, has a specific area resistance of about $10^{10}$ ohms whereas a carbon coating of the above-described type has a specific area resistance of about $10^7$ ohms. Since resistance increases with the length of the path and decreases with the width of the contact, the above factors are exactly the same whether measured in square centimeters, square inches, or square feet.

The invention is fully illustrated in the accompanying drawings in which:

Fig. 4 illustrates a method of double coating film.

Fig. 5 shows another method of trimming away the selvages.

Fig. 6 is a cross section of one edge of the film as coated in Fig. 4.

Fig. 7 is a cross section of the edge of a film in which the conducting border is spaced from the emulsion layer.

Fig. 8 illustrates the method of coating conducting borders in a combination of the present invention with one in which the finished film also has conducting borders.

Fig. 9 illustrates slitting the film in the latter embodiment of the invention.

Figure 1:
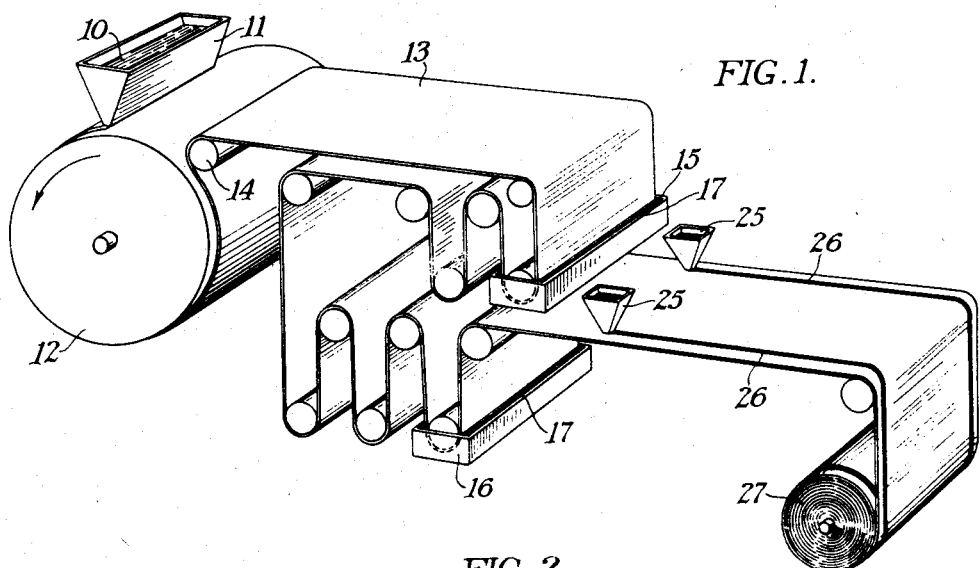
Fig. 1 shows a method of providing a film base necessary to the invention.

In Fig. 1 a film base dope 10 is coated from a hopper 11 onto a coating wheel 12 which rotates as shown by the arrow thereon. After the film has set it is stripped over a roller 14 to form the film base 13 which receives a subbing 17 on one or both sides of the film by passing successively through subbing baths 15 and 16. This is just representative of the application of one or more subbings as is known. According to the invention, this film base is provided with conducting borders 26 covering at least part of the selvages and preferably overlapping slightly onto the area between the selvages, which borders 26 are deposited on the film base from hoppers 25. Of course the exact area coming within the above adopted definition of selvage is that which is to receive no emulsion and hence is not indicated until the emulsion is coated. After coating and drying the base is wound up to form a roll 27 thereof.

Figure 2:
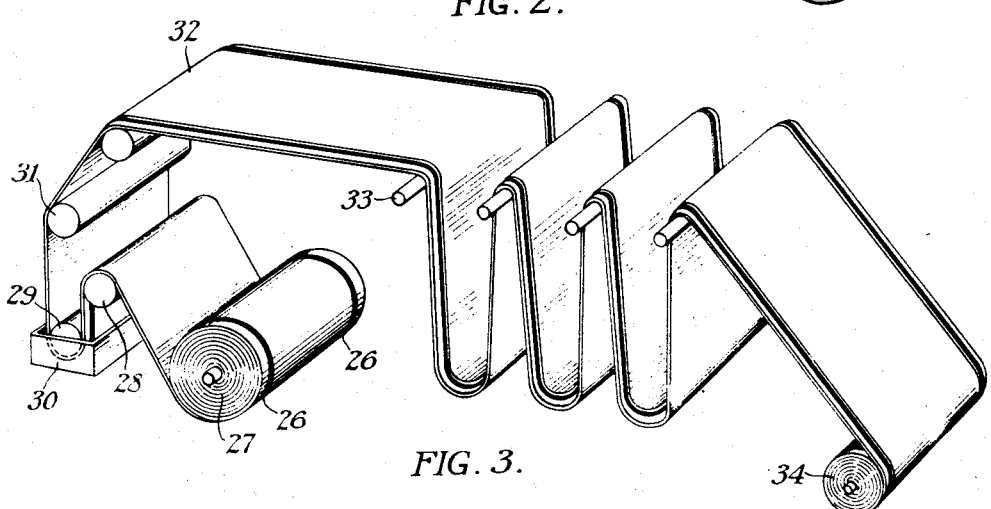
Fig. 2 shows one form of the emulsion coating in which the invention is applicable.

This roll 27 is then transferred as shown in Fig. 2 to an emulsion coating machine and is drawn over rollers 28 and 29 to pass through an emulsion coating bath 30 and over a suitable roller 31 to be chilled and dried in the usual manner forming an emulsion coating 32 on the film base between the selvages. The film is hung on bars 33 for drying and then is rolled up into a roll 34.

Figure 3:
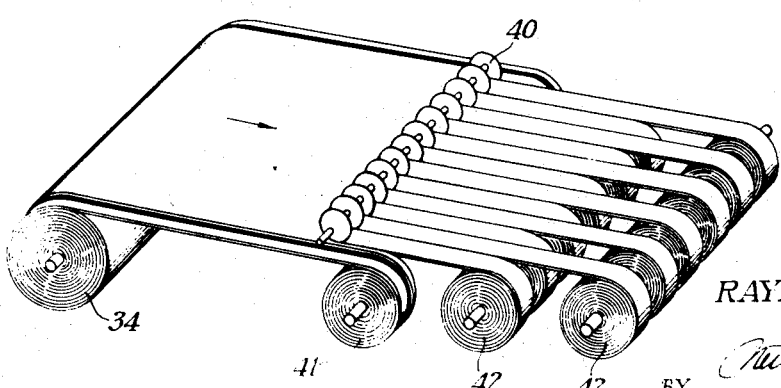
Fig. 3 illustrates a preferred method of trimming away the conducting border.

As shown in Fig. 3 this roll 34 is transferred to a slitting machine and the film is unwound from the roll past slitters 40 which cut the film into motion picture widths wound onto spools 42. At the same time, or even before the main slitting operation, the edges including the conducting borders, the selvages and part of the emulsion coated area are trimmed away and wound onto spools 41 as shown.

Fig. 4 differs from Fig. 2 in that the emulsion 51 is applied from a hopper 50 instead of by dip coating and provides an emulsion layer 52 which overlaps the conducting border 26 very slightly. The film is then supported entirely by the edges and moved between wheels 53 while drying and after the layer 52 is dry or nearly so, the other surface of the base is coated by dipping in a pan 60 forming a second emulsion layer 61. This double-coated film is then wound up on a roll 62 which, as shown in Fig. 5, is transferred to a slitting and cutting machine whereat the slitting wheels 65 trim off the edges and conducting strips onto reels 66. These slitting wheels 55 together with a trimming knife 67 cut the film into suitable sizes forming rectangular pieces 68 of film.

The exact positions of the various elements as shown in the embodiment illustrated in Fig. 4, appears in the cross-section of the film edge as shown in Fig. 6. The film base 13 provided with a selvage 21 and subcoatings 17 has a conducting border 26 covering part of the selvage 21 and also, in this particular embodiment, part of the area inside the selvage. The emulsion layer 52 is coated so as to overlap the layer 26 at least partially. After that the other surface of the film base is coated with an emulsion layer 61 as shown.

An alternative arrangement is shown in Fig. 7 wherein the conducting border 26' covers practically all of the selvage up to the edge of the film base, but not quite in to the area in which the emulsion layer 52' is coated. It is preferable to have the area between the conducting border 26' and the emulsion layer 52' as small as possible so as not to be an additional source of static, but this arrangement has been found to work quite satisfactorily even though there is no electrical contact between the two layers 26' and 52'. This is due to the fact that the majority of the static would be formed near the edges, but by the conducting layer 26' is prevented from such formation.

Figs. 8 and 9 illustrate the combination of this invention with another one. Fig. 8 is similar to Fig. 1 except that four hoppers 70 provide four conducting strips 71 at regular intervals across the film base. These intervals, (e. g. the distance between the centers of the two inner strips) are each equal to the desired width in the finished film. After this film base is wound up to form a roll 72 it is coated with emulsion as indicated by the box 73 forming a roll 75 having an emulsion layer 76 thereon. As shown in Fig. 9 this roll is then transferred to a slitting machine having slitters 78 which slit along the conducting strips 71. The two edge strips cover a portion of the selvage which is trimmed away to form rolls 79, whereas the two inner strips 71, as indicated by broken lines 77 are now covered with the emulsion 76. With this arrangement, each of the finished rolls 80, is provided with a narrow conducting border as indicated by the broken lines which borders are not wide enough to encroach upon any of the area to be used for exposing. Thus films with conducting borders can be produced conveniently at the same time as the present invention is being practiced, for eliminating static during film manufacture.

Having thus described in detail various embodiments of my invention, I wish to point out that it is not limited to the specific procedures illustrated but is of the scope of the appended claims.

What I claim and desire to secure by Letters Patent of the United States is:

1. The method of manufacturing photographic film substantially free of static which comprises forming a roll of film base with selvages and conducting borders covering at least a portion of the selvages, then coating a photosensitive layer onto at least one surface of the base between the selvages, drying the layer, rolling up the coated roll and then passing the film from the latter roll through trimmers to remove the selvages and conducting borders.

2. The method according to claim 1 in which the conducting border also covers a strip inside the selvage and the photosensitive layer is coated over the strip thus overlapping the border.

3. The method according to claim 1 in which the conducting border is placed along and covering substantially all of both selvages of the film base.

4. The method according to claim 1 in which the conducting border is between 1/16-inch and 3-inches wide.

5. The method according to claim 1 in which the conducting ingredient of the border is carbon.

6. The method of manufacturing photographic film substantially free of static which comprises placing an electrically conducting border along at least one selvage of a roll of film base, then coating and drying a photosensitive layer onto one surface of the base while supporting the base by the selvages and then trimming off the conducting selvages.

7. The method of manufacturing double-coated photographic film substantially free of static which comprises placing an electrically conducting border along the selvages of a roll of film base, then coating and drying a photosensitive layer onto one surface of the base while supporting the film base by the selvages, then, while still so supporting the film and without rolling it up between coatings, coating a second photosensitive layer onto the other surface of the film base, drying the second photosensitive layer and then trimming off the selvages and the conducting borders.

8. The method according to claim 1 in which a plurality of slitters are included with said trimmers so that said passing the film through trimmers to remove the selvages simultaneously slits the roll into strips.

9. The method according to claim 6 including the step of slitting the film into a plurality of strips simultaneously with said trimming.

10. The method of manufacturing photographic film substantially free of static which comprises placing an electrically conducting border along at least one selvage of a roll of film base, then coating and drying a photosensitive layer onto at least one surface of the base and then trimming off the conducting selvages.

RAYEN W. TYLER.